United States Patent [19]

Nakata

[11] Patent Number: 4,814,950

[45] Date of Patent: Mar. 21, 1989

[54] AUTOMOTIVE HEADLIGHT OF PROJECTOR TYPE

[75] Inventor: Yutaka Nakata, Isehara, Japan

[73] Assignee: Ichikoh Industries Limited, Tokyo, Japan

[21] Appl. No.: 135,271

[22] Filed: Dec. 21, 1987

[30] Foreign Application Priority Data

Dec. 23, 1986 [JP] Japan ........................... 61-196843[U]

[51] Int. Cl.$^4$ ........................... B60Q 1/00; F21V 5/00

[52] U.S. Cl. ........................................ 362/61; 362/80; 362/331; 362/332; 362/346

[58] Field of Search ................... 362/61, 80, 346, 331, 362/332

[56] References Cited

U.S. PATENT DOCUMENTS

| | | | |
|---|---|---|---|
| 1,764,622 | 6/1930 | Goodwin | 362/331 |
| 4,517,630 | 5/1985 | Dieffenbach | 362/331 |
| 4,727,458 | 2/1988 | Droste | 362/346 |

FOREIGN PATENT DOCUMENTS

| | | | |
|---|---|---|---|
| 3525041 | 1/1987 | Fed. Rep. of Germany | 362/61 |
| 791505 | 9/1935 | France | 362/331 |

*Primary Examiner*—Douglas Hart
*Attorney, Agent, or Firm*—Foley & Lardner, Schwartz, Jeffrey, Schwaab, Mack, Blumenthal & Evans

[57] ABSTRACT

The automotive headlight of projector type comprises a reflector, a lamp bulb as light source disposed near the focus of said reflector, a convex lens which projects frontwardly the light emitted from the lamp bulb, reflected by the reflector and then converged to a predetermined light collecting area, and a light transmitting means device through which the light is projected directly and frontwardly from the lamp bulb. The light emitted directly from the lamp bulb is positively projected frontwardly through the light transmitting device without passing through the convex lens. Therefore, the zones surrounding the illuminated zone are blurred. The luminous intensity of the zone near the boundary between the illuminated and non-illuminated zones can be gradually decreased going outwardly away from the projector axis into the non-illuminated zone without any influence on the illumination distribution of the zone illuminated by the light projected through the convex lens.

5 Claims, 5 Drawing Sheets

AUTOMOTIVE HEADLIGHT OF PROJECTOR TYPE

BACKGROUND OF THE INVENTION

1. Field of the Invention

The present invention relates to an automotive headlight of the projector type, and more particularly to a projector-type headlight of which the luminous intensity in a region near the boundary between a zone illuminated with the light frontwardly projected through a convex lens and a non-illuminated zone decreases gradually as going from the illuminated zone to the non-illuminated zone.

2. Description of the Related Art

Generally, the projector-type automomotive headlight of a car has such a luminous intensity pattern as to brightly illuminate the lane of travel of the car without dazzling the drivers of the cars running in the opposite direction. Such a luminous intensity pattern comes from the fact that the light projected from a lamp bulb and reflected by a reflector is shaped into an appropriate pattern by a shade located between the lamp bulb and a convex lens and then projected through the convex lens. The projector-type headlight of this kind has an optical system as schematically shown in FIGS. 1 and 2. As seen from these Figures, the reflector 10 has an inner surface formed as a reflecting surface constituting a part of a spheroid, the lamp bulb 12 as a light source is disposed at the inner focus of the spheroid and the shade 13 is located at the outer focus. This outer focus of the spheroid also lies in the focal plane of the convex lens 14 disposed in front of the reflector 10, The shade 13 has an edge formed along the meridional image surface i-j so that the reflected light from the reflecting surface of the reflector 10 is incident upon the meridional image surface i-j. The edge of the shade 13 has such a cut line as to let pass the upper half of the reflected light beam from the reflector 10 and a part of the lower half thereof while blocking the majority of the latter, whereby the light shaped by the shade 13 is projected frontwardly as converged by the convex lens 14. The lamp bulb 12 is fixed to the reflector 10, while the reflector 10, shade 13 and convex lens 14 are fixed on the frame 15. FIG. 3 is an isocandela diagram of a headlight of such a projector type. In this diagram, the horizontal angle of the light with respect to the axis of the reflector is taken horizontally while the vertical angle with respect to the reflector axis is taken vertically. For example, this isocandela diagram is presented by the curves resulting from connecting the points of equal luminous intensity on, for example, a screen placed outside the convex lens 13 and on which the light is projected from the headlight.

FIG. 4 shows isolux lines formed on the horizontal ground when the light is projected onto the ground from a headlight of such a projector type which is placed at a height of 65 cm from the ground level. In this diagram, the transverse distance from the light source is taken along the horizontal axis while the frontward distance from the light source is along the vertical axis. As seen from this diagram, the headlight of this projector type provides so definite a boundary between the illuminated and non-illuminated zones that when the driver turns his eyes from the illuminated zone to the non-illuminated zone, he will have a very dark field of vision in the latter zone. Such a lighting is apt to give the driver mental fatigue and anxiety. With the headlight of such a projector type, the driver cannot clearly see any walker crossing the lane of his car, for example, a pedestrian's crossing illuminated by a street light. Also, when the driver is going to turn along a curve with a small radius of turn, he will not clearly see the running course ahead of the curve.

SUMMARY OF THE INVENTION

The present invention has a primary object to overcome the above-mentioned drawbacks of the prior-art headlight assemblies of projector type by providing an improved headlight of the projector type.

The present invention has another object to provide a projector-type headlight of which the luminous intensity in a region near the boundary between the illuminated zone and the non-illuminated zone gradually decreases going from the illuminated zone to the non-illuminated zone without any substantial influence on the distribution of luminous intensity in the illuminated zone.

The present invention has a still another object to provide a projector-type headlight which can illuminate, in a relatively wide range, both the lateral sides of the to-be-illuminated lane without any substantial influence on the distribution of luminous intensity.

The present invention has yet another object to provide a projector-type headlight of which the light projecting zone appears spread horizontally as viewed from the direction of the reflector axis.

These and other objects and advantages of the present invention will be better understood from the ensuing description made by way of example of the embodiments of the present invention with reference to the drawings.

BRIEF DESCRIPTION OF THE DRAWINGS

FIGS. 5 thru 8 show one embodiment of the projector-type headlight according to the present invention, of which, FIG. 5 is a schematic diagram showing the optical system of the projector-type headlight;

FIG. 6 shows the positional relation between the convex lens and aperture;

FIG. 7 is an isocandela diagram of the projector-type headlight; and

FIG. 8 shows the isolux curves formed on the ground by the projector-type headlight.

DETAILED DESCRIPTION OF THE PREFERRED EMBODIMENT

Figure 1:
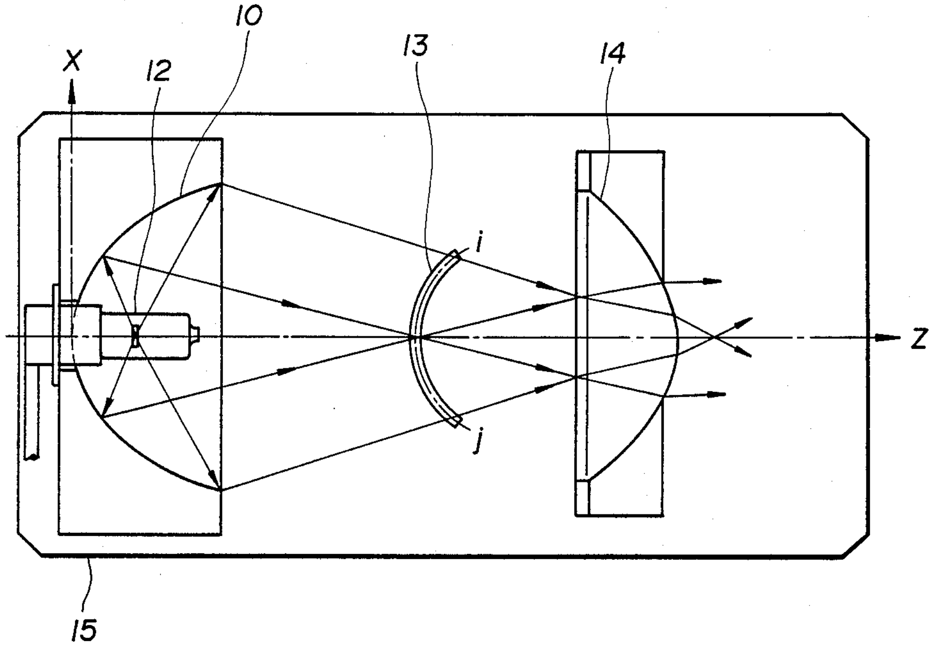
FIG. 1 (prior art)
FIG. 1 is a plan view schematically showing the optical system of the conventional headlight of projector type.
Figure 6:
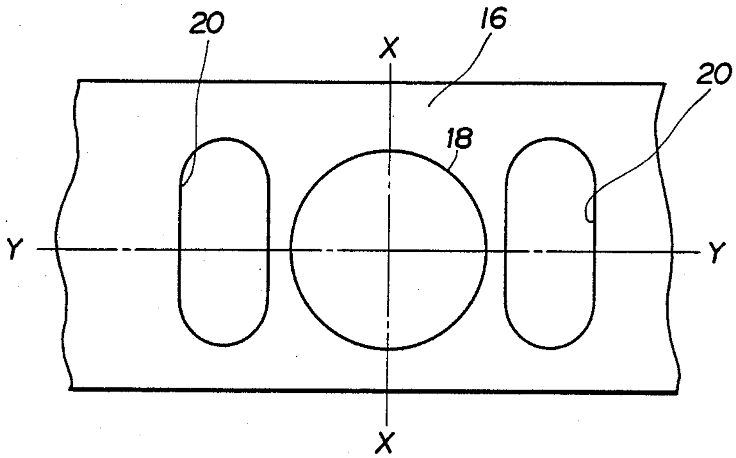

The projector-type headlight shown in FIG. 1 is one embodiment of the present invention. In this Figure, the elements indicated with the same reference numerals as those of the elements of the conventional headlight of projector type shown in FIG. 1 are same as or equivalent to those in FIG. 1. The reflector 10 has an inner surface formed as a reflecting surface 10*a* constituting a part of a spheroid, the lamp bulb 12 as light source is located at the inner focus of the spheroid while the shade 13 is at the outer focus. This outer focus of the spheroid also lies in the focal plane of the convex lens 14 disposed in front of the reflector 10. The shade 13 had an edge formed along the meridional image surface i-j of the convex lens 14 so that the reflected light from the reflecting surface of the reflector 10 is incident upon the meridional image surface i-j. The edge of the shade 13 has such a cut line as to let pass the upper half of the reflected light beam from the reflector 10 and a half of the lower half thereof while blocking the majority of the latter, whereby the light shaped by the shade 13 is projected frontwardly as converged by the convex lens 14. The lamp bulb 12 is fixed to the reflector 10 while the reflector 10, shade 13 and convex lens 14 are fixed on the frame 15. The frame 15 is secured within a housing of the headlight of projector type, and the convex lens 14 is disposed near the opening of the housing 22. Further, there is disposed along the plane in which the convex lens 14 is installed, namely, in a direction parallel to the X-Y plane, an opaque inner panel 16 of which both ends are secured using an adhesive 30 along with the circumferential ends of a cover 24 which will be described later to the opening ends, respectively, of the housing 22. The reference numeral 32 indicates a lid which closes the opening formed in the back of the housing 22 and through which the lamp bulb 12 is installed. The inner panel 16 has a circular aperture 18 formed at the center thereof as shown in FIG. 6, and the convex lens 14 is fitted in the aperture 18. The inner panel 16 has also an oval aperture 20 on either side of the circular aperture 18. Thus, most of the light emitted from the lamp bulb 12 and reflected from the reflector 10 passes through the convex lens 14 while of the light not reflected by the reflector 10 but directly projected frontwardly from the lamp bulb 12, the light A of a solid angle larger than a predetermined one passes through the apertures 20. In this embodiment there are formed in the inner panel 16 the two physical apertures 20 through which the light directly projected frontwardly from the lamp bulb 12 is passed. However, it is apparent to those skilled in the art that these apertures 20 may be replaced with oval transparent areas formed on the opaque inner panel 16. The provision of the aperture 20 on either side of the convex lens 14 is so intended that of the light projected through the convex lens 14, the light having passed through the apertures 20 is guided more outwardly than the light projected laterally away from the reflector axis. The cover 24 is secured covering the opening ends of the housing 22. This cover 24 has integrally formed on the inner surface thereof corresponding to the selected paths of the light having passed through the apertures 20 light-dispersion prisms 26 by which the light having passed through the apertures 20 is refracted and dispersed outwardly of the cover 24. This dispersed light helps blurring of the edge of the zone illuminated by the light converged by the convex lens 14, namely, the boundary between the very bright zone around the axis of the reflector and the zones to the right and left thereof. In other words, the headlight according to the present invention provides an illumination distribution pattern consisting of a bright zone illuminated by the light reflected by the reflector 10 and then frontwardly projected as converged by the convex lens 14, of which the brightness gradually decreases going outwardly away from the reflector axis.

Figure 3:
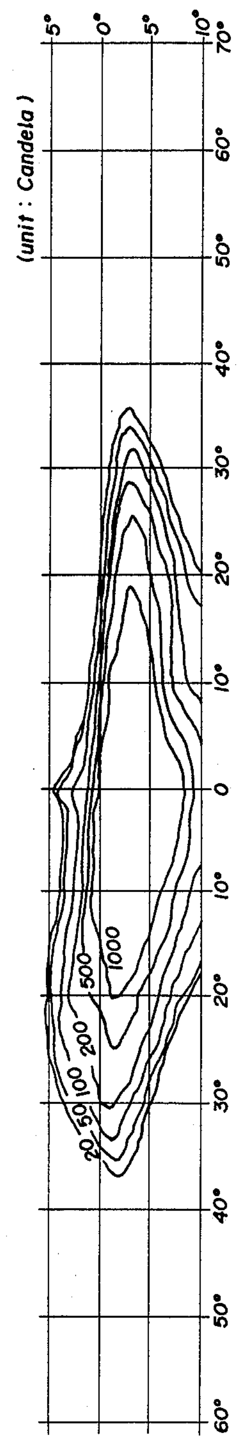
FIG. 3 (prior art)
FIG. 3 is an isocandela diagram derived from the conventional headlight of projector type.
Figure 7:
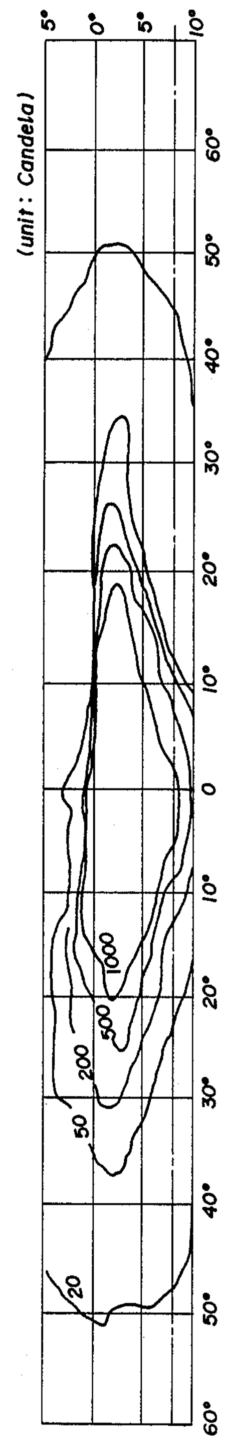
Figure 4:
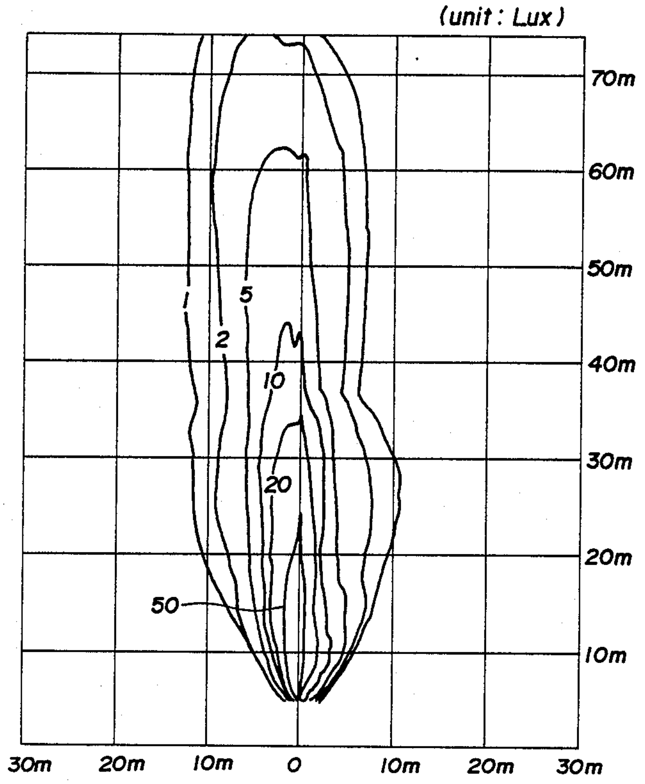
FIG. 4 (prior art)
FIG. 4 shows isolux curves formed on the ground by the conventional headlight.
Figure 5:
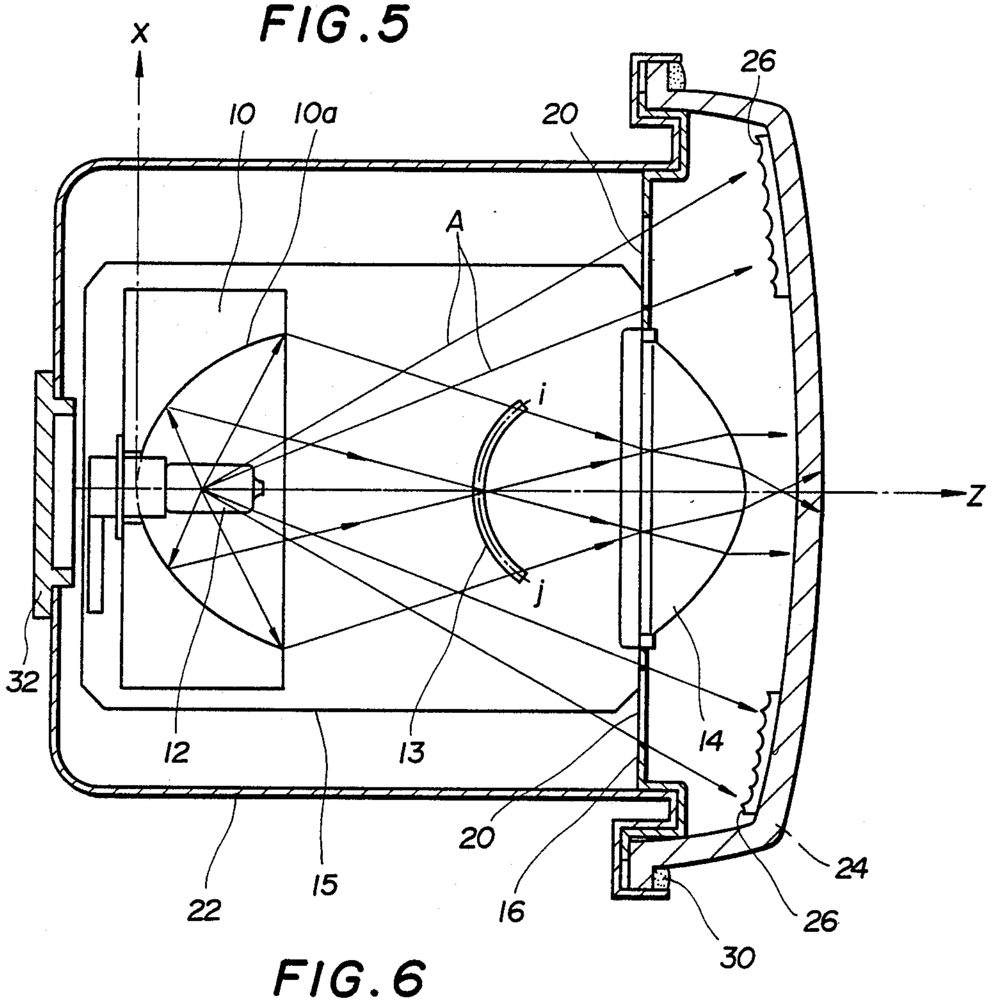

FIG. 7 is an isocandela diagram formed on a screen placed outside the cover 24. As evident from the comparison with the isocandela diagram obtained by the conventional headlight of projector type without any elements like inner panel 16 and dispersion prisms 26, the zones of 1000 candelas within a range of about 20 degrees to the right and left, respectively, of the reflector axis stand in nearly the same positions of those in FIG. 3 but the zones of 1000 to 20 candelas in luminous intensity extend within the ranges of 20 to 50 degrees to the right and left, respectively, of the reflector axis. This means, as having been suggested previously, that the luminous intensity of the zones to the right and left of the reflector axis gradually decreases going outwardly and in a wider range than with the conventional projector-type headlight while maintaining the luminous intensity in the very bright zones of 20 degrees to the right and left, respectively, of the reflector axis.

Figure 2:
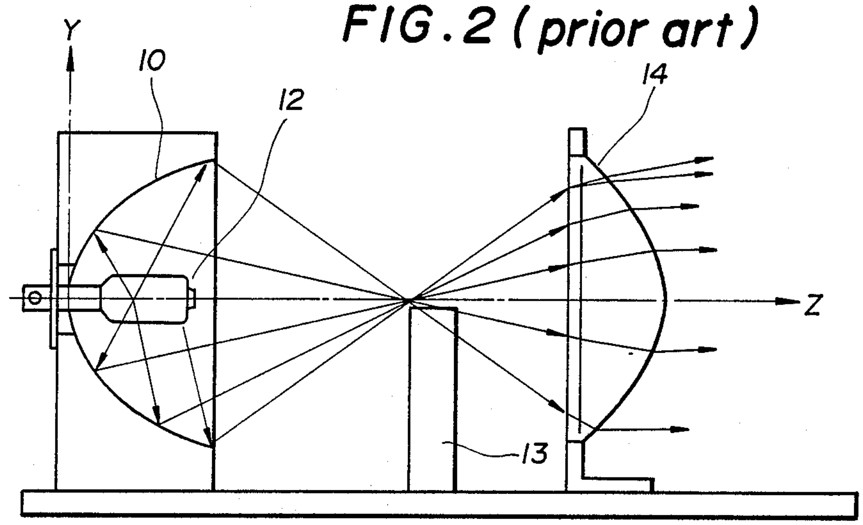
FIG. 2 (prior art)
FIG. 2 is a front view of the headlight in FIG. 1.
Figure 8:
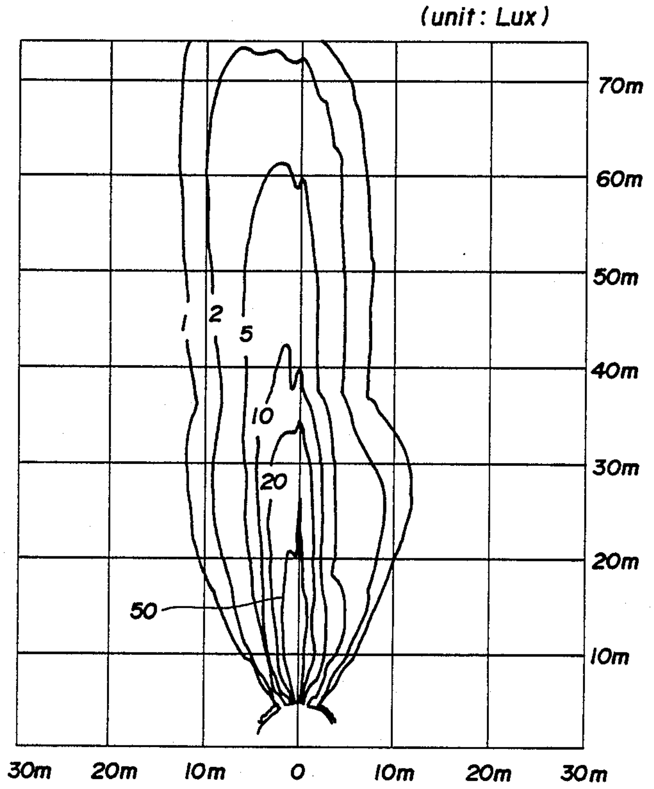

FIG. 8 shows isolux curves formed on the ground by the headlight of projector type according to the present invention. As is evident from the comparison with the isolux curves of the conventional projector-type headlight shown in Figure, it is possible, according to the present invention, to enlarge the illumination distribution at the intermediate and short distances of 10 to 30 meters from the light source rightwardly and leftwardly without changing the luminous intensity at a long distance of 60 to 70 meters frontwardly away from the light source. As having been described in the foregoing, there are provided to the right and left of the convex lens 14 the apertures 20 through which the light from the lamp bulb 12 can be directly passed, and on the inner surface of the cover 24 the dispersion prisms 26 corresponding to the light having passed through the apertures 20. Thus, the cover 24 is extended horizontally, whereby the light projecting area of the headlight is sufficiently large as viewed from the front of the headlight as compared with the conventional projector-type headlight. In the conventional devices, light refracted through the convex lens is projected in a direction generally perpendicular to the reflector axis as shown in FIG. 2. So the area of the cover has only to be a little larger than that of the convex lens. The cover 24 extends horizontally according to the present invention, which raises the value of the projector-type headlight according to the present invention.

As having been described in the foregoing, the dispersion prisms 26 in this embodiment are formed integrally on the inner surface of the cover 24. However, the present invention is not limited to this embodiment and the prisms may be provided between the inner panel 16 and cover 24 in a range in which, the light having passed through the apertures 20 exists.

What is claimed is:

1. An automotive headlight of the projector type, having a reflector, a lamp bulb disposed as a light source near the focus of said reflector and a convex lens projecting frontwardly the light emitted from said lamp bulb, reflected by said reflector and then converged to a predetermined light collecting area, comprising:

light transmitting means provided on a plane in which said convex lens is provided and through which the light emitted directly from said lamp bulb frontwardly can be passed, said light transmitting means comprising an opaque panel disposed in the installation plane of said convex lens and surrounding the latter and at least a light transmitting area formed on said panel.

2. An automotive headlight according to claim 1, said light transmitting area being a physically formed opening.

3. An automotive headlight according to claim 2, wherein a plurality of said openings are provided one on each of the right and left sides of said convex lens.

4. An automotive headlight according to claim 3, in which there are provided dispersion prisms in the paths, respectively, of the lights having passed said apertures.

5. An automotive headlight of the projector type, having a reflector, a lamp bulb disposed as a light source near the focus of said reflector and a convex lens projecting frontwardly the light emitted from said lamp bulb, reflected by said reflector and then converged to a predetermined light collecting area, comprising:

light transmitting means provided adjacent said convex lens and through which the light emitted directly from said lamp bulb frontwardly can be passed, said light transmitting means comprising an opaque panel disposed on a plane passing through said convex lens and surrounding the latter and at least a light transmitting area formed on said panel.

* * * * *